United States Patent [19]

Baranoff-Rossine

[11] Patent Number: 5,128,933
[45] Date of Patent: Jul. 7, 1992

[54] PROCESS AND DEVICE FOR THE RADIO TRANSMISSION OF CODED DATA SUPERIMPOSED ON A TRADITIONAL FREQUENCY-MODULATED BROADCAST

[76] Inventor: Dimitri Baranoff-Rossine, 7, rue Moliere, Paris, France, 75001

[21] Appl. No.: 259,136

[22] Filed: Oct. 18, 1988

Related U.S. Application Data

[63] Continuation-in-part of Ser. No. 760,342, Jul. 29, 1985, abandoned.

[51] Int. Cl.$^5$ .............................................. H04J 1/00
[52] U.S. Cl. ...................................... 370/69.1; 370/11
[58] Field of Search .......................... 370/69.1, 11, 76; 381/3, 4, 14; 455/44, 45

[56] References Cited

U.S. PATENT DOCUMENTS

| 3,627,949 | 12/1971 | Krecic et al. | 455/44 |
| 3,980,954 | 9/1976 | Whyte | 455/45 |
| 4,310,854 | 1/1982 | Baer | 370/76 |

FOREIGN PATENT DOCUMENTS

0066076 8/1982 European Pat. Off.

OTHER PUBLICATIONS

H. R. Anderson & R. C. Crane, "A Technique for Digital Information Broadcasting Using SCA Channels", IEEE Transactions on Broadcasting, vol. BC-27, No. 4, pp. 65-70.

S. R. Ely, "The Impact of Radio-Data on Broadcast Receivers", The Radio and Electronic Engineer, vol. 52, No. 5, pp. 291-296, Jun. 1982, based on a paper presented at the IERE Conference on Radio Receivers and Associated Systems in Leeds in Jul. 1981.

Primary Examiner—Douglas W. Olms
Assistant Examiner—H. Kizou
Attorney, Agent, or Firm—Brumbaugh, Graves, Donohue & Raymond

[57] ABSTRACT

The device comprises an input unit for generating coded data to be transmitted, an FSK coder-modulator for modulating, by frequency shift, the coded data to be transmitted, in a frequency range located between about 15 and 18 KHz, a mixer circuit for superimposing, with an attenuation of 20 to 40 dB, the signals modulated by frequency shift on a low-frequency signal of a traditional program to be applied to a frequency modulation radio transmitter, a decoder comprising filter circuits and an FSK demodulator for separating the coded data from the signals delivered by a standard frequency modulation receiver, and a display or recording unit for displaying or recording the demodulated, filtered, transmitted coded data.

11 Claims, 5 Drawing Sheets

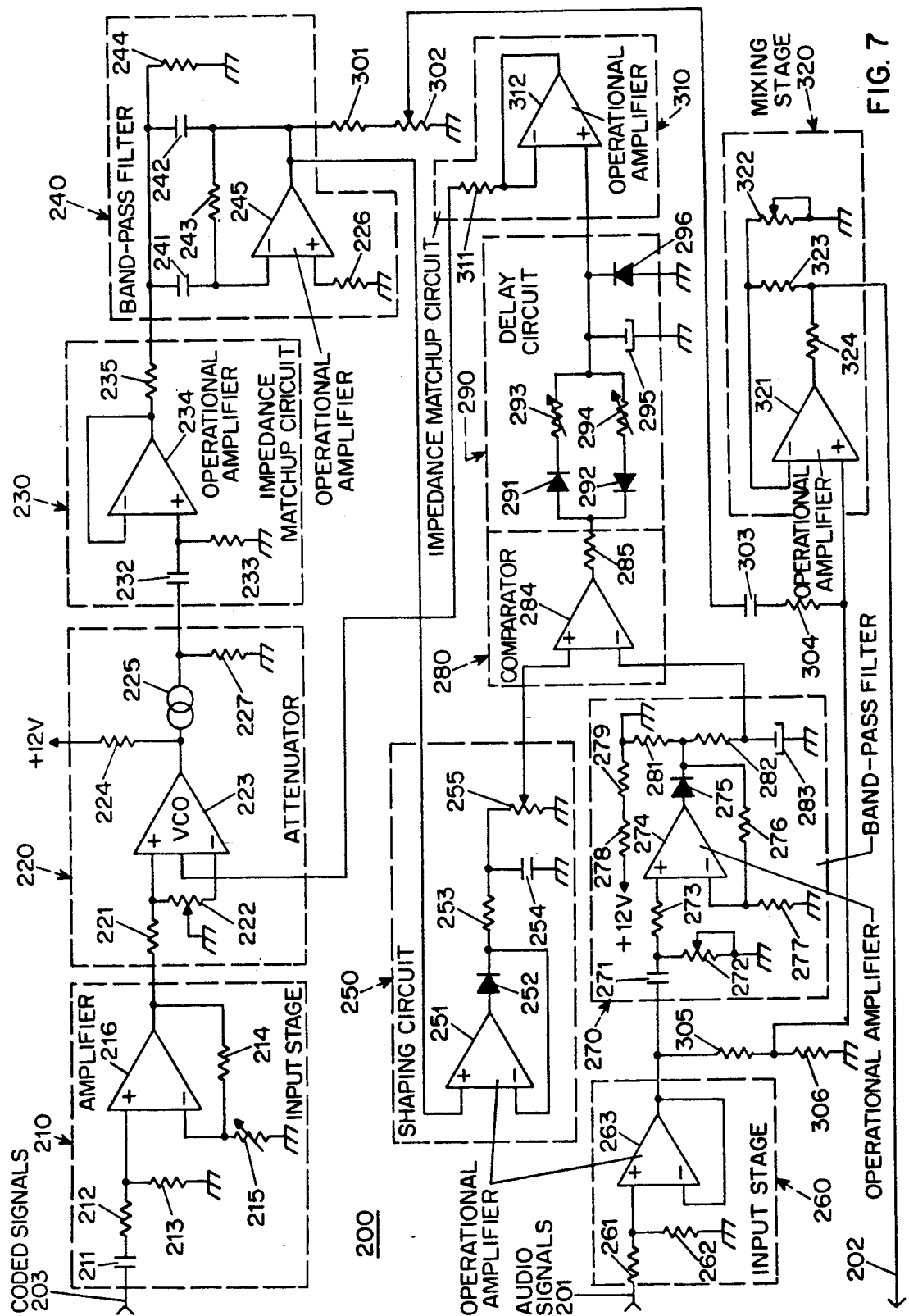

PROCESS AND DEVICE FOR THE RADIO TRANSMISSION OF CODED DATA SUPERIMPOSED ON A TRADITIONAL FREQUENCY-MODULATED BROADCAST

FIELD OF THE INVENTION

This application is a continuation-in-part of presently pending U.S. application Ser. No. 760,342 filed on Jul. 29, 1985, now abandoned. The present invention relates to a process and a device for the radio transmission of coded data superimposed on a traditional frequency-modulated broadcast.

BACKGROUND OF THE INVENTION

The invention relates more particularly to a process for the radio transmission of coded data superimposed on a traditional frequency-modulated broadcast wherein coded data to be transmitted are modulated in a predetermined frequency range in order to create modulated coded signals. The modulated coded signals are mixed with the low-frequency signals of a traditional program to be broadcast by a frequency modulation radio transmitter, the signals delivered by a frequency modulation receiver are filtered in order to isolate the said modulated coded signals. The filtered, modulated coded signals are demodulated and the transmitted coded data are displayed or recorded by applying the demodulated, filtered coded signals to a display or recording unit.

A variety of systems for the radio transmission of coded data are already known. In general, these systems constitute warning or watching devices and require the existence of transmitters and receivers specially designed for the transmission of coded data.

Furthermore, attempts have already been made to superimpose, on a conventional radio broadcast, certain signals for controlling particular functions. However, applications of this type are very specific and do not permit the reception and display, in uncoded form, of coded data which are capable of complementing the content of audio data transmitted conventionally by radio waves.

It has also been proposed to superimpose coded data on a conventional frequency-modulated radio broadcast by adding a low-level subcarrier modulated by coded signals. However, the proposed systems have not as yet made it possible to obtain reliable transmissions without substantially impairing the main program or the additional coded signals.

SUMMARY OF THE INVENTION

The precise aim of the present invention is to overcome the above-mentioned disadvantages and to make it possible, without impairing the quality of a conventional frequency-modulated radio broadcast, reliably to transmit supplementary code data which are capable of complementing the conventional radio broadcast.

These objects are achieved by virtue of a process of the type defined at the start of the description wherein the coded data to be transmitted are modulated by frequency shift in a frequency range located between about 15 and 18 kHz, wherein the coded signals modulated by frequency shift are mixed, with an attenuation of 20 to 40 dB relative to the maximum transmission level, with the said low-frequency signals of a traditional program, and wherein the ratio of the frequency deviation of the coded signals modulated by frequency shift, expressed in Hertz, to the rate of transmission of the coded data to be transmitted, expressed in bauds, is kept between about 85 and 120% and preferably around 100%.

Preferably, the signals modulated by frequency shift are applied downstream of the stereophonic filters of the frequency modulation transmitter in order to mix the modulated signals with the signals of a traditional radio program.

Advantageously, the reception signals to be filtered are tapped upstream of the de-emphasis circuits of the standard frequency modulation receiver.

The demodulated filtered reception signals can be displayed on a data processing terminal, which makes it possible to control the checking of the filtering characteristics.

According to the invention, a device for the radio transmission of coded data superimposed on a traditional frequency-modulated broadcast comprises an input unit for generating coded data to be transmitted, an FSK coder-modulator for modulating, by frequency shift, the coded data to be transmitted, in a frequency range located between about 15 and 18 kHz, a mixer circuit for superimposing, with an attenuation of 20 to 40 dB, the signals modulated by a frequency shift on a low-frequency signal of a traditional program to be applied to a frequency modulation radio transmitter, a decoder comprising filter circuits and an FSK demodulator for separating the coded data from the signals delivered by a standard frequency modulation receiver, and a display or recording unit for displaying or recording the demodulated, filtered, transmitted coded data.

The display unit can be a standard television receiver or the display unit of a data processing terminal equipped with an outlet for peripherals and, if appropriate, with an adapter circuit. A link can be provided between the data processing terminal, displaying the transmitted coded data, and the programmable filters of the decoder for sending out programmable check codes.

The decoder also comprises a level adapted arranged at the input and two level-checking units arranged on either side of the filter circuits.

The device according to the invention is suitable for the transmission of coded data representing, for example, the title of a record, an advertising message or commercial information.

The coded message, which is preferably respectively transmitted, can comprise various check characters or coded characters which cannot be displayed.

BRIEF DESCRIPTION OF THE DRAWINGS

Further characteristics and advantages of the invention will become apparent from the following description of embodiments of the invention, with reference to the attached drawing; in this drawing:

FIG. 7 shows a preferred embodiment of a mixer circuit which can be incorporated in the broadest part of the broadcast part of the device according to the invention.

DETAILED DESCRIPTION OF THE PREFERRED EMBODIMENT

Figure 1:
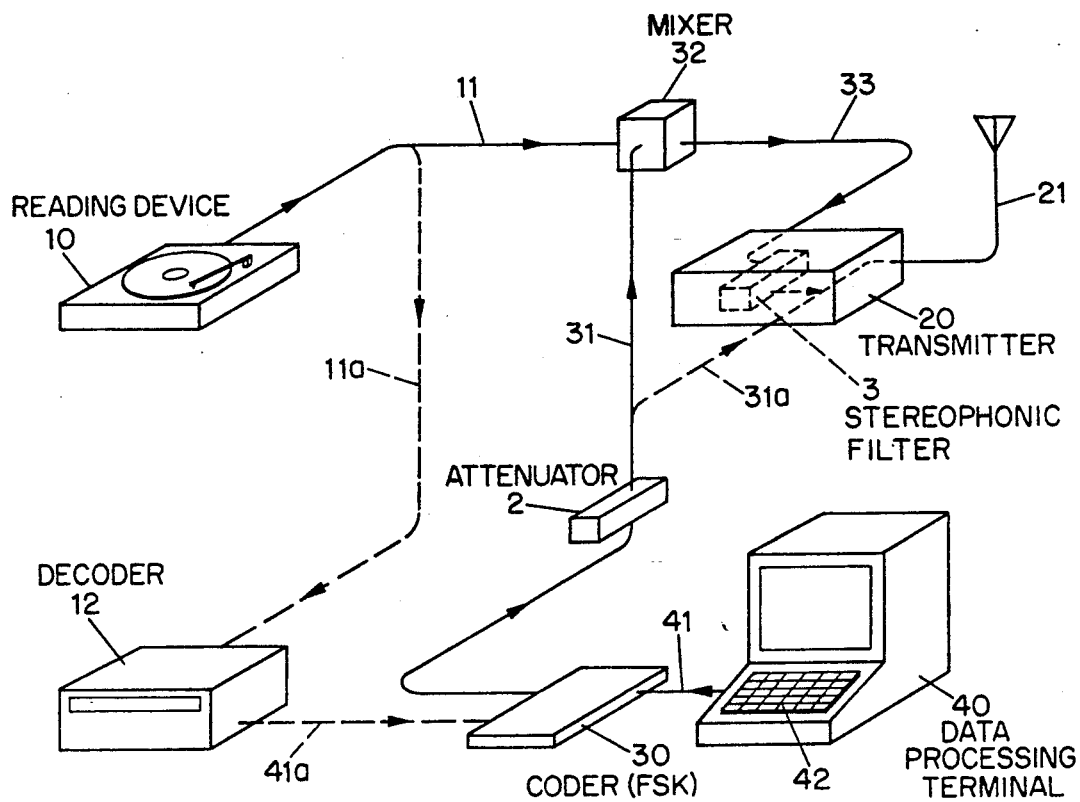
FIG. 1 schematically represents the various items of equipment to be used for the broadcast part of a transmission device according to the invention, FIG. 2 schematically represents the various items of equipment to be used for the reception part of a transmission device according to the invention.

Referring to FIG. 1, this figure shows a conventional frequency modulation transmitter 20 equipped with an antenna 21 and intended for receiving, via a line 11, a low-frequency electrical signals representing a radio program to be broadcast and originating from a microphone or from a system for reading recorded information, such as a record player turntable 10 or a tape or cassette recorder. In the absence of any other device, the radio program is simply transmitted conventionally by the FM transmitter 20 and its antenna 21.

According to the invention, before the frequency-modulated broadcast, coded digital signals from line 31 are superimposed, in a mixer 32, on the program signals applied via the line 11, so that the FM transmitter then receives a mixture of conventional low-frequency signals and coded signals via the line 33.

The coded signals can be formed very easily from messages in uncoded form with the aid of a conventional data processing terminal 40 equipped with a key pad and capable of delivering, via a line 41, signals coded according to a preset code, for example in RTTY code according to an RS 232 format. The terminal 40 can include a conventional unit for the storing and management of texts.

The coded signals can also originate directly from a memory or other recording medium. In one possible application, the coded signals can be formed from the reading of a bar code with the aid of an optical reading device. In another application, the coded signal can consist of coded signals which are non-decodable after radio transmission but which are already present in the recording medium read in the reading device 10 for the radio broadcast by the transmitter 20. In this case, the signals produced by the reading device 10 can also be applied, via the line 11a, to a decoder 12 suitable for decoding coded magnetic tapes, cassettes or discs. The signals produced by the decoder 12 via the line 41a, which comprise a coded message, can then be used to feed into the coder 30 provided for receiving the coded signals transmitted via the line 41.

Figure 6:
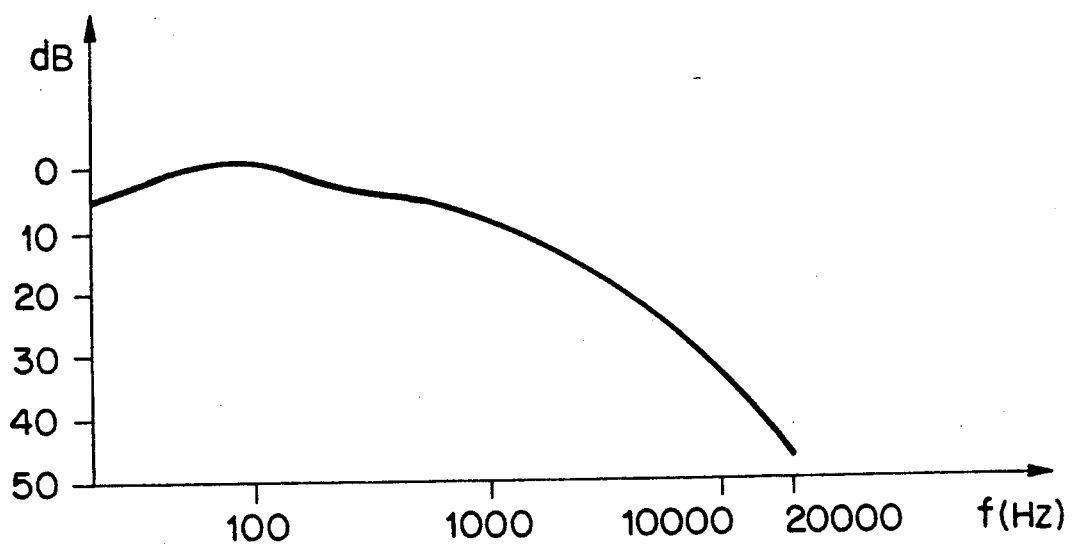
FIG. 6 shows a curve of the average recording level of a music signal as a function of the frequency.

The coder 30 essentially comprises a modulator 34 of the FSK type (frequency shift Keying) so that it can transmit, via the line 31, coded signals characterized by two predetermined frequency levels. According to the invention, the FSK modulator 34 is designed so that the frequency levels of the coded signals are located between about 15 kHz and 18 kHz and an attenuator is provided at the output of FSK modulator 34 so that the level of the coded signals in the line 31 is attenuated by 20 to 40 dB in order to take account of the curve of the level of the LF signals usually transmitted via the line 11 (see FIG. 6). Thus, after mixing in the mixer 32 with the LF signals present in the line 11, the coded signals in the line 31 do not affect the quality of the conventional radio broadcast, nor are they suppressed by the filters of the conventional frequency modulation transmitters or receivers.

It is pointed out that, in an advantageous variant, the coded signals can be introduced directly into the FM transmitter 20, via the line 31a shown as a broken line in FIG. 1, downstream of the stereophonic filters 3. In this case, the mixer 32 of FIG. 1 is naturally suppressed and the line 33 transmits the same signals as the line 11. The reinjection of coded signals after the stereophonic filters 3 of the FM transmitter makes it possible subsequently to facilitate separation of the coded signals on reception, by virtue of the gain obtained in the frequency band of the FSK modulated coded signals.

Figure 2:
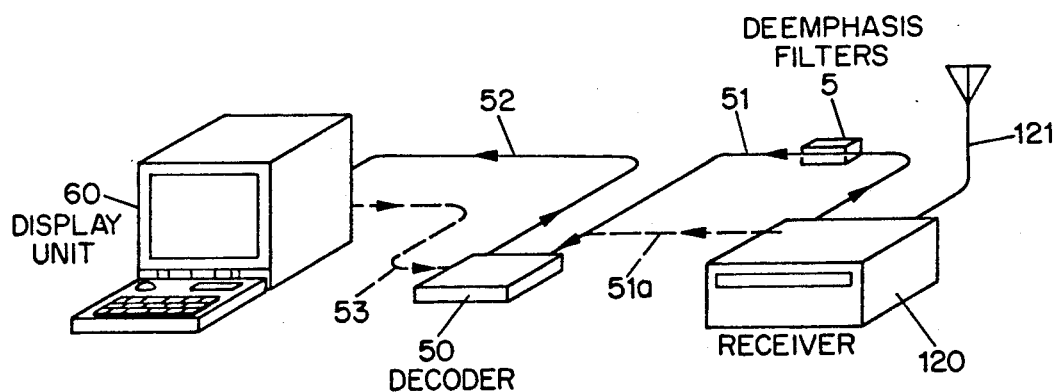

FIG. 2 schematically represents the components of the reception system of a device according to the invention. These components essentially comprise a standard frequency modulation receiver 120 with its antenna 121, a decoder 50 and a display unit 60, which can be a standard television receiver or a data processing terminal equipped with an inlet for peripherals. The signals applied to the decoder 50 can be tapped from an audio outlet via a line 51 or, preferably, via a line 51a shown as a broken line in FIG. 2, before the de-emphasis circuits 5 of the receiver 120, which affords a gain of the order of 10 to 15 dB in the frequency band containing the coded signals.

The coded signals, which, in the decoder 50, are separated from the conventional radio message, are applied to the display unit 60 via a line 52 and can then appear in uncoded form on the screen. At the same time, the listener can listen to the usual radio program. Of course, the decoder 50 can be integrated into the housing of the FM receiver 120 if required. Furthermore, in the case where the display unit 60 consists of a data processing terminal, it is also possible to send coded check signals to the decoder 50 via the line 53 from the terminal 60 in order to be able to adapt to different reception circumstances and to control, for example, the programming of the quality factor or of the central frequency of the filter contained in the decoder.

A recording unit consisting of a memory, for example, can be substituted for or associated with the display unit 60 for recording the coded signals produced by the decoder 50.

Figure 3:
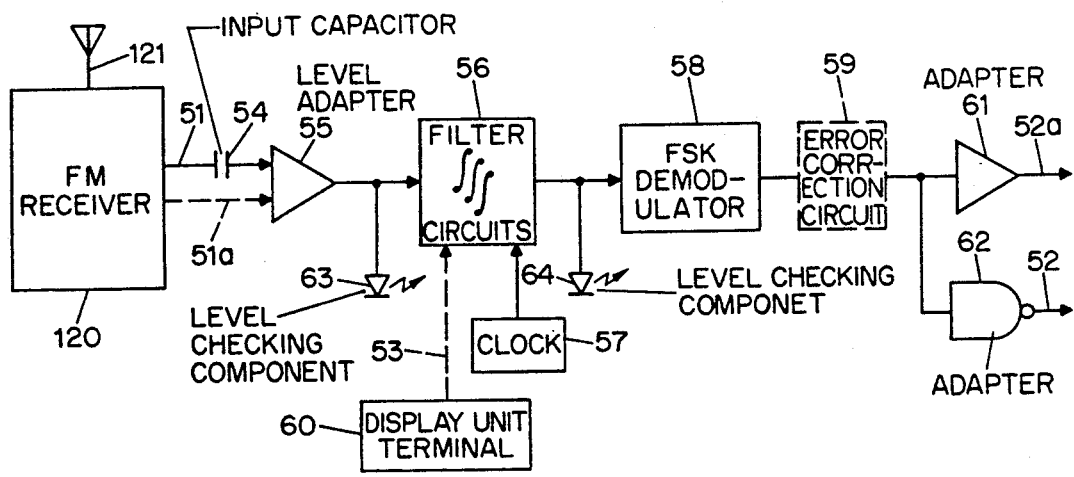
FIG. 3 is the block diagram of the reception part of a device according to the invention.

FIG. 3 shows the components forming the decoder 50. A level adapter 55 receives, via an input capacitor 54, the complex signals delivered via the lines 51 or 51a by the FM receiver 120, as indicated previously. The output of the level adapter 55 is connected to filter circuits 56, which are preferably programmable capacitor switched bandpass filters, associated with a clock 57. The filters can be programmed permanently with the aid of keys, but the programming can also be adapted by the use of the unit 60 consists of a data processing terminal.

Level-checking components 63, 64 are arranged respectively before and after the filter circuits 56. A phase loop FSK demodulator 58 is placed at the output of the filters 56, and error correction circuits 59, sensitive to coded error correction signals, can be placed at the output of the FSK demodulator 58 if required. Adapters 61, 62, which depend on the type of display unit 60, are inserted between the output of the decoder 50 and the lines 52a, 52 respectively, which are provided for connection to two display units 60 of different types.

Figure 4:
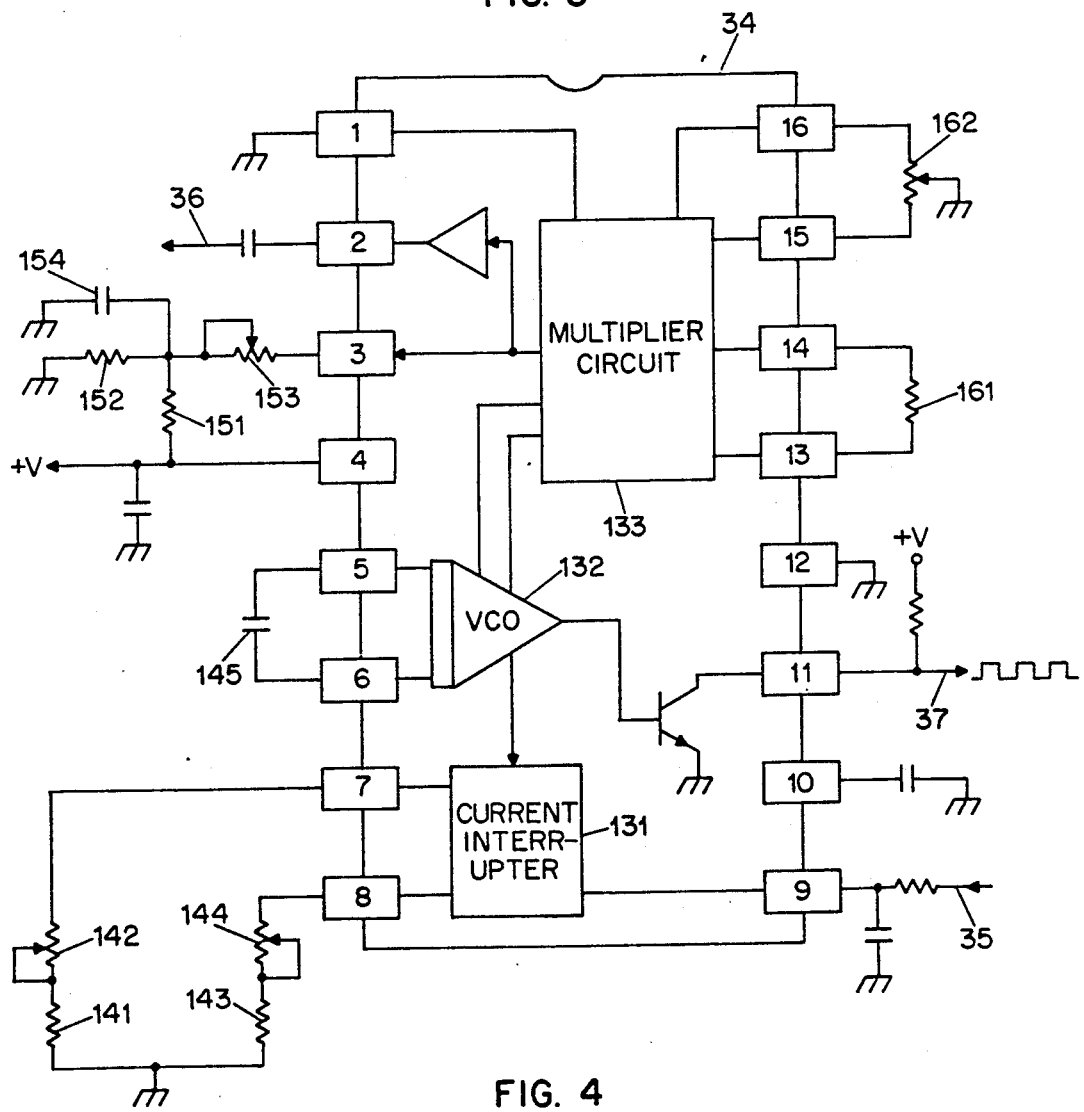
FIG. 4 shows an embodiment of a coder modulator circuit which can be incorporated in the broadcast part of the device according to the invention.

FIG. 4 shows a particular example of an FSK modulator which can be incorporated in the coder 30 of FIG.

1. This modulator 34 is constructed around a standard base circuit, for example the XR2206 circuit from the Company EXAR, and has characteristics which can be adapted with the aid of external resistors and capacitors. The coded signals are applied to the input 35 and the sinusoidal FSK modulated output signals are available at an output 36. Square-wave output signals are available for checking purposes at an output 37. As can be seen in FIG. 4, the FSK modulator 34 can comprise a base circuit with current interrupters, 131, a voltage controlled oscillator circuit (VCO) 132 and a multiplier circuit 133 which also converts the signals to sinusoidal form. The external components can then comprise resistors or potentiometers 141 to 144 and a frequency-regulating capacitor 145, resistors or potentiometers 151 to 153 and a capacitor 154 for regulating the output signal level, and resistors or potentiometers 161, 162 for adjusting the shape and symmetry of the sinusoidal output signal with the aim of obtaining minimum distortion.

To have a good signal-to-noise ratio and to reduce intermodulation, it is desirable for the ratio of the frequency deviation of the signals modulated by frequency shift, expressed in Hertz, to the rate of transmission of the coded data to be transmitted, expressed in bauds, to be between about 85 and 120% and preferably around 100%. Thus, with a transmission rate of 300 bauds, it is desirable for the frequency shift caused by the FSK modulator to be, for example, ±150 Hz.

Figure 5:
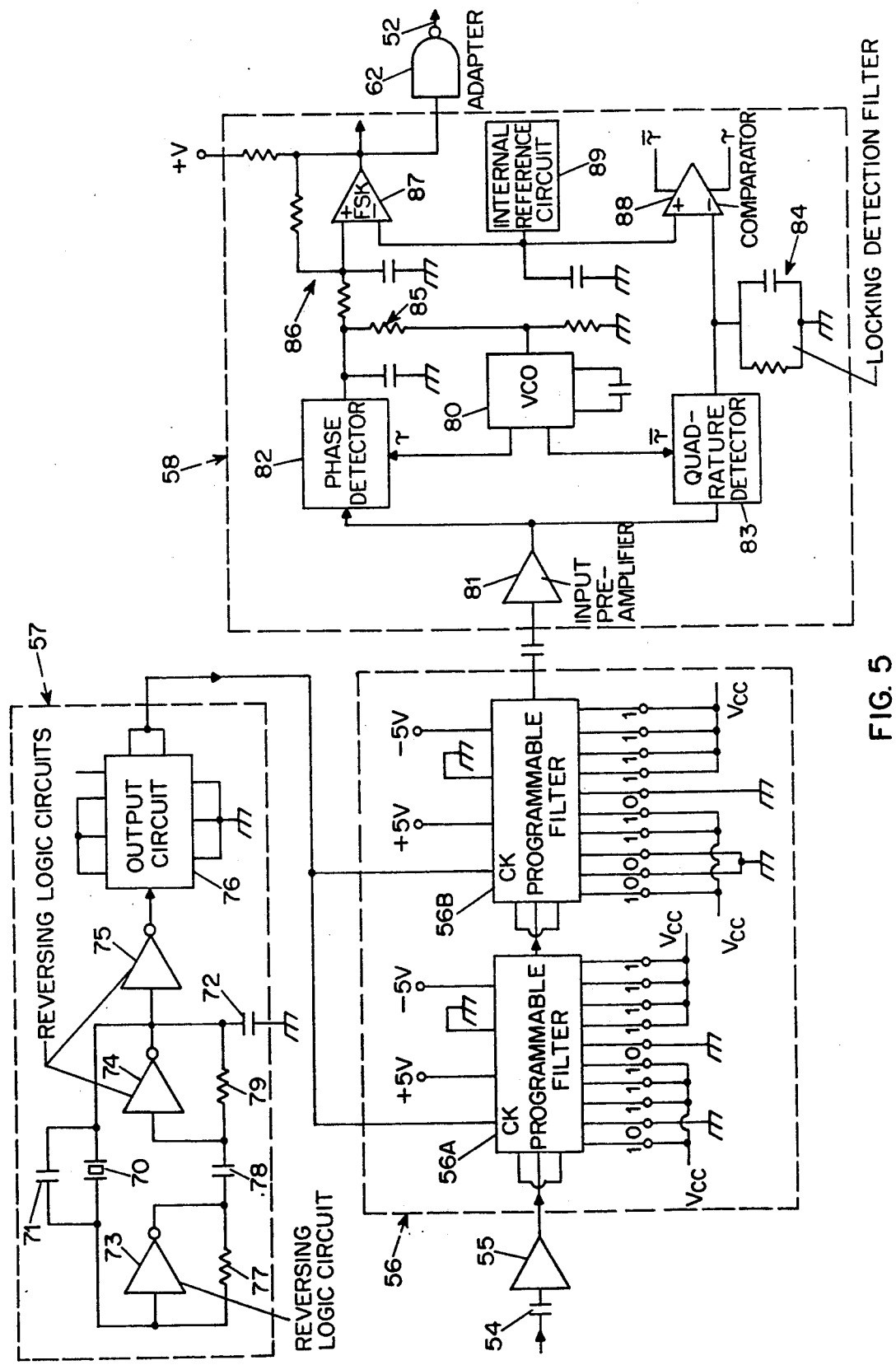
FIG. 5 shows an example of filter and demodulation circuits of a decoder which can be incorporated in the reception part of the device according to the invention.

FIG. 5 shows, in greater detail, an embodiment of a decoder-demodulator circuit 50 with a clock 57 comprising a frequency reference component 70, connected in parallel with a capacitor 71, and reversing logic gates 73, 74, 75 associated with resistors 77, 79, capacitors 72, 78 and an output circuit 76 consisting of a frequency divider (dividing by 9 for example), which makes it possible for example to deliver clock pulses of the order of 1 MHz at a frequency of 8 MHz divided by 9.

The filter circuit system 56 comprises first and second switched capacitor filters 56a, 56b, which can consist, for example, of the R5620 circuits from the Company RETICON. The characteristics of the programmable filters 56a, 56b can be determined by interrupters, as shown in FIG. 5, or by control signals produced by the terminal 60, as indicated previously. The filters 56a, 56b can be of the bandpass or high-pass type.

The demodulator 58 shown in FIG. 5 is of a conventional configuration with an input preamplifier 81, a voltage controlled oscillator circuit (VCO) 80, a phase detector 82 and a quadrapture detector 83, a locking detection filter 84, loop and data filters 85, 86, a comparator for detecting a locking condition, 88, an internal reference circuit 89 and an FSK comparator 87 delivering output signals corresponding to the demodulated, transmitted coded signals.

It is desirable if the coded data to be repetitively transmitted.

Furthermore, the transmitted coded message will advantageously comprise check characters including an image clearing code, placed before each phase of the message, as well as an end-of-message signaling code.

In one possible application, the transmitted coded message comprises coded characters which cannot be displayed and the transmitted coded characters which cannot be displayed are recorded by applying the demodulated filtered signals to a memory unit. This can contribute for example to facilitating the measurement of the ratings of radio stations identified by a particular code.

The invention is particularly suitable for the use of the decoder-demodulator in combination with a personal data processing terminal such as the one known as ALCATEL 250. In this case, it is desirable for the check characters to include a character which ensures that the personal terminal is in the scroll mode.

As already explained a key feature of the present invention is constituted by the provision of mixing means which may superimpose on a low frequency signal of a conventional broadcasting program coded signals modulated by frequency shift and exhibiting an attenuation of 20 to 40 dB with respect to the maximum transmission level of the conventional broadcasting program.

According to a first embodiment, the maximum transmission level of the low-frequency signals of a program to be applied to a frequency modulation radio transmitter is determined over a fixed predetermined period of time which may exceed several minutes or is derived from the technical specifications of the broadcasting station. As a matter of fact, for a particular FM radio transmitter the transmission level is limited to a certain maximum value which is compatible with the particular electronic circuits incorporated in the radio transmitter and/or is determined by the peripheral devices (microphone, record player turntable, tape or cassette recorder). In such a case the coded signals are attenuated with a fixed attenuation of 20 to 40 dB with respect to the maximum transmission level which has been determined once for all either theoretically from the specifications of the different devices of the radio transmitter and its peripheral devices or practically from different tests carried out with a traditional test program on the radio transmitter. As already explained referring to FIG. 6, the maximum transmission level of conventional LF signals usually corresponds to signals representing low pitched sounds with a frequency of about 100 Hz.

According to a second embodiment of the present invention which may be considered as a preferred embodiment, the maximum transmission level of the FM broadcast is determined permanently during the broadcasting and the attenuation of the coded signals is slaved to remain in a range of 20 to 40 dB with respect to a maximum transmission level which is constituted by the instantaneous level of the traditional FM low frequency signals to be broadcasted. In such an embodiment the level of the coded signals is slaved to the level of the LF signals of the conventional program and is higher when the level of the LF signals increases and lower when the level of the LF signals decreases. However there is always an attenuation of between 20 and 40 dB of the coded signals with respect to the conventional LF broadcast.

This second embodiment which implies that the attenuation of the coded signals be slaved to the instantaneous level of the LF frequency modulated signals, allows the coded signals to be at a very low level during the transmission periods without any significant LF frequency modulated signals thus reducing the risk of errors due to beating with other signals.

A mixed circuit 200 incorporating attenuation means according to the above-mentioned second embodiment will now be described referring to FIG. 7. The mixing circuit 200 may thus be applied to mixing block 32 of FIG. 1.

On FIG. 7, the coded signals which are FSK modulated are applied on line 203. The coded signals may be FSK modulated with a subcarrier frequency of 17 kHz and a frequency deviation of ±100 Hz.

A conventional multiplex signal or an FM audio signal suitable for an FM audiosignal suitable for an FM radio transmission is applied on line 201.

According to the simplest embodiment of the present invention the coded signals applied on line 203 would be applied to an attenuator having fixed characteristics and attenuating the coded signals by a predetermined amount, e.g. about 40 dB relative to the maximum transmission level of the conventional multiplex signal applied on line 201, said maximum transmission level being determined as a function of the characteristics of the source of multiplex or audio signals. The attenuated FSK modulated coded signals would then be simply mixed with the FM audio signals to output on line 202 connected to a standard FM radio transmitter a composite signal having coded data superimposed on a traditional frequency-modulated broadcast.

The embodiment of FIG. 7 is a slightly more complex embodiment inasmuch as it comprises an attenuation circuit 220 whose characteristics are modified as a function of the level of the audio signals applied on line 201. The audio signals inputted on line 201 are processed in a set of series-connected processing blocks 270, 280, 290 which deliver on line 226 a control signal which modifies the characteristics of attenuator 220 in such a manner that the attenuation of the FSK modulated coded signals is lower when the level of audio signals is high and may be in the range—25 dB to–30 dB, and is higher when the level of audio signals is low or when the audio signals are absent during pauses of the broadcast. In the latter case the attenuation may be about −40 dB.

The audio signals inputted via line 201 and the attenuated FSK modulated coded signals are then mixed at the input of an output circuit 320.

More specifically, on FIG. 7, reference numeral 210 designates a conventional input stage which provides impedance matching and comprises a capacitor 211, an operational amplifier 216, fixed resistors 212, 213 and 214 and an adjustable resistor 215.

Reference numeral 220 designates an attenuator which comprises a voltage controlled amplifier 223, providing an attenuation which is a function of the voltage level of the signals applied via line 226 on the control input of amplifier 223. A fixed resistor 221 and potentiometer 222 are connected to the non inverting and inverting inputs of the amplifier 223 whereas a constant current sources 225 fed via a resistor 224 by a constant D.C. voltage and connected to the ground via a resistor 227 is connected at the output of amplifier 223.

Reference numeral 230 designates an impedance matching circuit connected at the output of attenuator 220 and comprising an operational amplifier 234, a capacitor 232 and resistors 233, 235.

A band-pass filter 240 is connected at the output of impedance matching circuit 230. Band-pass filter is centered on the subcarrier frequency of the FSK modulated coded signals, e.g. 17 kHz. Band-pass filter 240 comprises an operational amplifier 245, two capacitors 241, 242, two resistors 243, 246 and an adjustable resistor 244. The signals delivered by band-pass filter 240 are applied via a voltage divider 301, 302, a capacitor 303 and a resistor 304 to a mixing stage 320 to mix the attenuated FSK modulated coded signals with the frequency modulated multiplex or audio signals delivered from line 201 via an input stage 260 and a voltage divider 305, 306.

Input stage 260 comprises two resistors 261, 262 and an operational amplifier 263 and plays the conventional role of matching impedance.

Mixing stage 320 comprises an operational amplifier receiving on its non inverting input both the attenuated FSK modulated coded signals via resistor 304 and the audio signals via voltage divider 305, 306. Two fixed resistors 323 and 324 and an adjustable resistor 322 are further connected to operational amplifier 321 within the mixing stage 320 which outputs mixed signals on line 202 connected to a radio transmitter.

The multiplex or audio signals outputted by input stage 260 are further applied to a processing circuit 270 which constitutes a band-pass filter which eliminates lower frequencies, e.g. frequencies below 8 kHz and higher frequencies, e.g. frequencies beyond 20 kHz. As can be seen on the curve of FIG. 6, the average recording level of a music signal is lower for the highest frequencies. Since the evolution of the average recording level as a function of frequency usually corresponds to the curve of FIG. 6, the maximum transmission level of an audiosignal may be derived from a portion of the frequency spectrum such as the portion between about 8 kHz and 20 kHz.

As can be seen on FIG. 7, band-pass filter 270 comprises a capacitor 271, an operational amplifier 274, fixed resistors 273, 276, 277, an adjustable resistor 272 and a diode 275 which constitute a high pass filter with a cutoff frequency of 8 kHz and fixed resistors 278, 281, 282, potentiometer 279 and capacitor 283 which further constitute a low-pass filter with a cut-off frequency of 20 kHz. The voltage level at the output of band-pass filter 270 changes with the voltage level of audio signals inputted on line 201 and therefore the output of band-pass filter 270 may serve to slave attenuator 223 via line 226. However, in practice it is necessary to take into account the actual level of the FSK modulated coded signals outputted by stage 240 and to adapt the response time of attenuator 220. Thus, the raising time of the level of the coded signals when the level of audio signals decreases must be higher than the falling time of the level of the coded signals when the level of audio signals increases.

Due to a delay circuit 290 connected at the output of a comparator 280 the control signals applied via line 226 to the control input of attenuator 220 may be suitably delayed to confer an adequate response time to attenuator 220.

The comparator 280 comprises a resistor 285 and an operational amplifier 284 receiving on its non inverting input a signal which represents the level of coded signals outputted by band-pass filter 240. A shaping circuit 250 comprising an operational amplifier 251, a diode 252, a voltage divider 253, 255 and a capacitor 254 is interposed between band-pass filter 240 and comparator 280.

The delay circuit 290 comprises in parallel connection a first branch comprising the series connections of a diode 291 and an adjustable resistor 293 and a second branch comprising the series connection of a diode 292 and an adjustable resistor 294. The diodes 291 and 292 define opposite current flowing directions in the first and second branches. A capacitor 295 and a diode 296 are connected to the first and second branches comprising resistors 293, 294 having different resistances to define first and second time constants. The output of delay circuit 290 is connected to an impedance matching circuit 310 comprising an operational amplifier 312 and a resistor 311.

The use of a controlled attenuation of the FSK modulated coded signals makes the detection of the coded signals in a decoder easier even when the level of the audio signals is low.

I claim:

1. A process for the radio transmission of coded data superimposed on a traditional frequency-modulated broadcast, comprising:

modulating coded data to be transmitted, by frequency shift, in a predetermined frequency range between about 15 and 18 Khz to create modulated coded signals;

attenuating the frequency shift modulated coded signals by about 20 to 40 Db relative to a maximum transmission level of low-frequency signals of a traditional program and mixing the frequency shift modulated coded signals having an attenuation of about 20 to 40 Db relative to said maximum transmission level with the low-frequency signals of said traditional program, wherein the ratio of the frequency deviation of the coded signals modulated by frequency shift, expressed in Hertz, to the rate of transmission of the coded data to be transmitted, expressed in bauds, is kept between about 85 and 120%;

transmitting the mixed signal with a frequency modulated radio transmitter which includes stereophonic filters, said transmitter receiving low frequency signals upstream of said filters and receiving said frequency shift modulated coded signals downstream of said filters, said low frequency signals passing through said filters for said mixing with said frequency shift modulated signals;

receiving the mixed signal with a frequency modulated receiver;

filtering the signals received by the frequency modulation receiver to isolate the frequency shift modulated coded signals; and demodulating the filtered, frequency shift modulated coded signal to recover the coded data.

2. A process for the radio transmission of coded data superimposed on a traditional frequency-modulated broadcast, comprising:

modulating coded data to be transmitted, by frequency shift, in a predetermined frequency range between about 15 and 18 kHz to create modulated coded signals;

attenuating the frequency shift modulated coded signals by about 20 to 40 dB relative to a maximum transmission level of low-frequency signals of a traditional program and mixing the frequency shift modulated coded signals having an attenuation of about 20 to 40 dB relative to said maximum transmission level with the low-frequency signals of said traditional program, wherein the ratio of the frequency deviation of the coded signals modulated by frequency shift, expressed in Hertz, to the rate of transmission of the coded data to be transmitted, expressed in bauds, is kept between about 85 and 120%;

transmitting the mixed signal with a frequency modulation radio transmitter;

receiving the mixed signal with a frequency modulated receiver;

filtering the signals received by the frequency modulation receiver to isolate the frequency shift modulated coded signals; and demodulating the filtered, frequency shift modulated coded signals to recover the coded data, wherein said frequency modulation radio transmitter includes stereophonic filters, said transmitter receiving low frequency signals upstream of said filters and receiving said frequency shift modulated coded signals downstream of said filters, said low frequency signals passing through said filters for said mixing with said frequency shift modulated signals, and wherein the reception signals to be filtered are tapped upstream of de-emhasis circuits of the frequency modulation receiver.

3. A process for the radio transmission of coded data superimposed on a traditional frequency-modulated broadcast, comprising:

modulating coded data to be repetitively transmitted, by frequency shift, in a predetermined frequency range between about 15 and 18 Khz to create modulated coded signals;

attenuating the frequency shift modulated coded signals by about 20 to 40 dB relative to a maximum transmission level of low-frequency signals of a traditional program and mixing the frequency shift modulated coded signals having an attenuation of about 20 to 40 dB relative to said maximum transmission level with the low-frequency signals of said traditional program, wherein the ratio of the frequency deviation of the coded signals modulated by frequency shift, expressed in Hertz, to the rate of transmission of the coded data to be transmitted, expressed in bauds, is kept between about 85 and 120%;

transmitting the mixed signal with a frequency modulated radio transmitter;

receiving the mixed signal with a frequency modulated receiver;

filtering the signals received by the frequency modulation receiver to isolate the frequency shift modulated coded signals; and demodulating the filtered, frequency shift modulated coded signals to recover the coded data.

4. A process for the radio transmission of coded data superimposed on a traditional frequency-modulated broadcast, comprising:

modulating coded data to be transmitted, by frequency shift, in a predetermined frequency range between about 15 and 18 KHz to create modulated coded signals;

attenuating the frequency shift modulated coded signals by about 20 to 40 dB relative to a maximum transmission level of low-frequency signals of a traditional program and mixing the frequency shift modulated coded signals having an attenuation of about 20 to 40 dB relative to said maximum transmission level with the low-frequency signals of said traditional program, wherein the ration of the frequency shift, expressed in Hertz, to the rate of transmission of the coded data to be transmitted, expressed in bauds, is kept between about 85 and 120%;

transmitting the mixed signal with a frequency modulation ratio transmitter;

receiving the mixed signal with a frequency modulated receiver;

filtering the signals received by the frequency modulation receiver to isolate the frequency shift modulated coded signals; and demodulating the filtered, frequency shift modulated coded signals to recover the coded data, wherein the transmitted coded data are displayed by applying the frequency shift demodulated filtered signals to a display unit of a data processing terminal or of a television receiver, and wherein the transmitted coded data comprises check characters including an image clearing code placed before each phase of data defining a specific message.

5. A process for the radio transmission of coded data superimposed on a traditional frequency-modulated broadcast, comprising:

modulating coded data to be transmitted, by frequency shift, in a predetermined frequency range between about 15 and 18 KHz to create frequency shift modulated coded signals;

attenuating the frequency shift modulated coded signals by about 20 to 40 dB relative to a maximum transmission level of low-frequency signals of a traditional program and mixing the frequency shift modulated coded signals having an attenuation of about 20 to 40 dB relative to said maximum transmission level with the low-frequency signals of said traditional program, wherein the ratio of the frequency shift, expressed in Hertz, to the rate of transmission of the coded data to be transmitted, expressed in bauds, is kept between about 85 and 120%;

transmitting the mixed signal with a frequency modulation ratio transmitter;

receiving the mixed signal with a frequency modulated receiver;

filtering the signals received by the frequency modulation receiver to isolate the frequency shift modulated coded signals; and demodulating the filtered, frequency shift modulated coded signals to recover the coded data, wherein the transmitted coded data comprises coded characters which cannot be displayed and wherein the coded characters which cannot be displayed are recorded by applying the frequency shift demodulated filtered signals to a memory unit.

6. A device for the radio transmission of coded data superimposed on a traditional frequency-modulated broadcast, which comprises:

an input unit for generating coded data to be transmitted;

an FSK coder-modulator for modulating, by frequency shift, the coded data to be transmitted, in a frequency range located between about 15 and 18 kHz;

an attenuator for attenuating the frequency shift modulated coded signals by about 20 to 40 dB relative to a maximum transmission level of a low-frequency signal of a traditional program to be applied to a frequency modulation radio transmitter;

a mixer circuit for super-imposing the attenuated frequency shift modulated coded signals on the low-frequency signal;

a decoder comprising filter circuits and an FSK demodulator for separating the coded data from signals delivered by a standard frequency modulation receiver;

a module for displaying or recording the demodulated, filtered, transmitted coded data wherein the filter circuits comprise programmable switched capacitor bandpass filters, associated with a clock; wherein the module is a data processing terminal; and wherein a link is provided between the said data processing terminal, and the programmable filters of the decoder for sending out programmable check codes.

7. A device for the radio transmission of coded data superimposed on a traditional frequency-modulated broadcast, which comprises:

an input unit for generating coded data to be transmitted;

an FSK coder-modulator for modulating, by frequency shift, the coded data to be transmitted, in a frequency range located between about 15 and 18 kHz;

an attenuator for attenuating the frequency shift modulated coded signals by about 20 to 40 dB relative to a maximum transmission level of a low-frequency signal of a traditional program to be applied to a frequency modulation radio transmitter;

a mixer circuit for super-imposing the attenuated frequency shift modulated coded signals on the low-frequency signal;

a decoder comprising filter circuits and an FSK demodulator for separating the coded data from signals delivered by a standard frequency modulation receiver; and a module for displaying or recording the demodulated, filtered, transmitted coded data wherein the decoder also comprises;

a level adapter arranged at the input; and two level-checking units arranged on either side of the filter circuits.

8. A process for the radio transmission of coded data superimposed on a traditional frequency-modulated broadcast, comprising:

modulating coded data to be transmitted, by frequency shift, in a predetermined frequency range between about 15 and 18 Khz to create modulated coded signals;

attenuating the frequency shift modulated coded signals by about 20 to 40 Db relative to a maximum transmission level of low-frequency signals of a traditional program and mixing the frequency shift modulated coded signals having an attenuation of about 20 to 40 Db relative to said maximum transmission level with the low-frequency signals of said traditional program, wherein the ratio of the frequency deviation of the coded signals modulated by frequency shift, expressed in Hertz, to the rate of transmission of the coded data to be transmitted, expressed in bauds, is kept between about 85 and 120%;

continuously slaving the attenuation of the frequency shift modulated coded signals to the instantaneous level of the low-frequency signals of a traditional program;

transmitting the mixed signal with a frequency modulated radio transmitter;

receiving the mixed signal with a frequency modulated receiver;

filtering the signals received by the frequency modulation receiver to isolate the frequency shift modulated coded signals; and demodulating the filtered, frequency shift modulated coded signals to recover the coded data.

9. A device for the radio transmission of coded data superimposed on a traditional frequency-modulated broadcast, which comprises:
- an input unit for generating coded data to be transmitted;
- an FSK coder-modulator for modulating, by frequency shift, the coded data to be transmitted, in a frequency range located between about 15 and 18 kHz;
- an attenuator for attenuating the frequency shift modulated coded signals by about 20 to 40 dB relative to a maximum transmission level of a low-frequency signal of a traditional program to be applied to a frequency modulation radio transmitter;
- a mixer circuit for super-imposing the attenuated frequency shift modulated coded signals on the low-frequency signal;
- a decoder comprising filter circuits and an FSK demodulator for separating the coded data from signals delivered by a standard frequency modulation receiver;
- a module for displaying or recording the frequency shift demodulated, filtered, transmitted coded data; and
- means for slaving the attenuation rate of said attenuator as a function of the instantaneous transmission level of the low-frequency signal to be mixed with the frequency shift modulated coded signals.

10. A process for the radio transmission of coded data superimposed on a traditional frequency-modulated broadcast, comprising:
- modulating coded data to be transmitted, by frequency shift, in a predetermined frequency range between about 15 and 18 Khz to create modulated coded signals;
- attenuating the frequency shift modulated coded signals by about 20 to 40 dB relative to a maximum transmission level of low-frequency signals of a traditional program and mixing the frequency shift modulated coded signals having an attenuation of about 20 to 40 dB relative to said maximum transmission level with the low-frequency signals of said traditional program, wherein the ratio of the frequency deviation of the coded signals modulated by frequency shift, expressed in Hertz, to the rate of transmission of the coded data to be transmitted, expressed in bauds, is kept between about 85 and 120%;
- continuously slaving the attenuation of the frequency shift modulated code signals to the instantaneous level of the low-frequency signals of a traditional program;
- introducing a time delay before attenuation of the frequency shift modulated coded signals is changed when the instantaneous level of the low-frequency signals of a traditional program is changed;
- transmitting the mixed signal with a frequency modulated radio transmitter;
- receiving the mixed signal with a frequency modulated receiver;
- filtering the signals received by the frequency modulation receiver to isolate the frequency shift modulated coded signals; and
- demodulating the filtered, frequency shift modulated coded signals to recover the coded data.

11. The process according to claim 10, wherein the time delay introduced in case of a raising instantaneous level of the low-frequency signals is shorter than the time delay introduced in case of a falling instantaneous level of the low-frequency signals.

* * * * *

UNITED STATES PATENT AND TRADEMARK OFFICE
CERTIFICATE OF CORRECTION

PATENT NO. : 5,128,933
DATED : July 7, 1992
INVENTOR(S) : BEAU DE LOMENIE

It is certified that error appears in the above-identified patent and that said Letters Patent is hereby corrected as shown below:

5th line of ABSTRACT, "KHz" should be --kHz--

Col. 2, line 42, "level adapted" should read --level adapter--

Col. 2, line 49, "respectively" should read --repetitively--

Col. 3, line 15 delete "a" (second occcurence)

Col. 3, line 60, "attenuator" should read -attenuator 2--

Col. 4, line 55, "consists" should read --consisting--

Col. 5, line 57, "if the" should read --for the--

Col. 7, line 51, "sources" should read --source--

Col. 9, line 14, "Khz" should read--kHz--

Col. 10, line 51 "KHz" should read --kHz--

UNITED STATES PATENT AND TRADEMARK OFFICE
CERTIFICATE OF CORRECTION

PATENT NO. : 5,128,933

DATED : July 7, 1992

INVENTOR(S) : BEAU DE LOMENIE

It is certified that error appears in the above-identified patent and that said Letters Patent is hereby corrected as shown below:

Col. 10, line 60, "ration" should read --ratio--

Col. 11, line 18, "KHz" should read --kHz--

Col. 11, line 33, "ratio" should read --radio--

Col. 11, line 67, "recording the" should read --recording the frequency shift--

Col. 12, line 30, "recording the" should read --recording the frequency shift--

Col. 12, line 41, "Khz" should read --kHz--

Col. 13, line 35, "Khz" should read --kHz--

Col. 14, line 32, "raising" should read --rising--

UNITED STATES PATENT AND TRADEMARK OFFICE
CERTIFICATE OF CORRECTION

PATENT NO. : 5,128,933
DATED : July 7, 1992
INVENTOR(S) : BEAU DE LOMENIE

It is certified that error appears in the above-identified patent and that said Letters Patent is hereby corrected as shown below:

Col. 12, line 41, "Khz" should read --kHz--

Col. 13, line 35, "Khz" should read --kHz--

Col. 14, line 32, "raising" should read --rising--

Signed and Sealed this

Fourteenth Day of September, 1993

Attest:

BRUCE LEHMAN

Attesting Officer     Commissioner of Patents and Trademarks